United States Patent [19]

Horie et al.

[11] Patent Number: 5,596,024
[45] Date of Patent: Jan. 21, 1997

[54] SEALING COMPOSITION FOR LIQUID CRYSTAL

[75] Inventors: Ken'ichi Horie; Hidefumi Miura, both of Hachioji; Eiichi Tomioka, Tokyo, all of Japan

[73] Assignee: Three Bond Co., Ltd., Tokyo, Japan

[21] Appl. No.: 441,376

[22] Filed: Apr. 18, 1995

Related U.S. Application Data

[63] Continuation-in-part of Ser. No. 263,670, Jun. 22, 1994, abandoned.

[30] Foreign Application Priority Data

| Jun. 22, 1993 | [JP] | Japan | 5-173673 |
| Jun. 22, 1993 | [JP] | Japan | 5-173674 |
| Jun. 22, 1993 | [JP] | Japan | 5-173675 |

[51] Int. Cl.$^6$ .......................... C08F 2/50; C09J 163/10; C09J 163/00
[52] U.S. Cl. .......................... 522/103; 522/170; 522/81; 522/83; 522/42
[58] Field of Search .......................... 522/81, 83, 96, 522/97, 103, 170

[56] References Cited

U.S. PATENT DOCUMENTS

| 4,401,537 | 8/1983 | Chern et al. | 522/77 |
| 4,703,338 | 10/1987 | Sagami et al. | 525/922 |
| 4,786,579 | 11/1988 | Tazawa et al. | 522/103 |
| 4,959,398 | 9/1990 | Oka et al. | 528/88 |
| 5,137,936 | 8/1992 | Akiguchi et al. | 522/103 |
| 5,439,956 | 8/1995 | Noguchi | 522/103 |

FOREIGN PATENT DOCUMENTS 59-27914   2/1989   Japan .

*Primary Examiner*—Susan W. Berman
*Attorney, Agent, or Firm*—Oblon, Spivak, McClelland, Maier & Neustadt, P.C.

[57] ABSTRACT

A sealing compound for use in production of a liquid crystal display unit, comprises isobornyl(meth)acrylate, epoxy acrylate, a photopolymerizable initiator, epoxy resin having one or more polymerizable groups in one molecule, a latent thermosetting agent obtained by pretreating imidazole compounds, adducts of imidazole compounds and carboxylate of imidazole compounds, and/or adducts of imidazole compounds and epoxy resin with isocyanate compounds. The sealing compound is applicable particularly for sealing liquid crystal in between substrates of the liquid crystal display unit, and can secure the electrode substrates without misregistration of the substrates and uneven separation of the substrates.

8 Claims, No Drawings

SEALING COMPOSITION FOR LIQUID CRYSTAL

This application is a continuation-in-part of patent application Ser. No. 08/263,670 filed Jun. 22, 1994, now abandoned.

BACKGROUND OF THE INVENTION

1. Field of the Invention

This invention relates to a compound for sealing liquid crystal.

2. Description of the Prior Art

A liquid crystal display unit in which liquid crystal is confined between transparent substrates having driving electrodes for activating the liquid crystal has been so far assembled in the manner as described below.

First, a sealing agent is applied to one of two substrates each having the liquid crystal driving electrode by a screen printing method or by using a dispenser, and the electrode substrates are placed one upon another while putting bead- or rod-like spacer elements therebetween. Then, the sealing agent between the substrates with electrodes is hardened under pressure to seal the liquid crystal between the substrates.

Conventionally, one-liquid thermosetting epoxy resin has been generally used as the sealing agent. Or, it has been proposed to use photo(UV)-setting adhesive consisting of epoxy acrylate for the sealing agent as a principal component (Japanese Patent Application Public Disclosure No. HEI 1-243029(A)).

Although the thermosetting adhesive conventionally used as the sealing agent has excellent moisture resistance, it consumes two or more hours to completely harden by heating, resulting in decrease of workability in assembling the liquid crystal display unit and so on. Disadvantageously, there is a possibility that the electrode substrates between which the liquid crystal is confined do not precisely meet each other and cannot be held leaving a uniform gap therebetween.

On the other hand, the photo(UV)-setting resin which is hardened at room temperature for a short time does not easily cause lateral aberration or dislocation of the electrode substrates and is advantageous in assembling the liquid crystal display unit. However, the conventional adhesive consisting of epoxy acrylate adhesive is insufficient in adhesive strength for securing the substrates for confining the liquid crystal.

An adhesive agent consisting of polyether-modified polyurethane acrylate or polyester-modified polyurethane acrylate as a principal constituent possibly degrades light distribution efficiency required for conducting an experiment to evaluate the properties such as of moisture resistance of the adhesive.

Thus, a sealing agent possessing both properties of photo(UV)-setting functional group and thermosetting functional group has also been proposed, but it is very inferior in preservative stability to a one-fluid epoxy resin. Moreover, since this sealing agent should be exposed to ultraviolet rays, and heated to confine the liquid crystal between the electrode substrates when manufacturing the liquid crystal display unit. Thus, the sealing agent of functional group cannot also improve productivity of manufacturing the liquid crystal display unit.

It has been known that an imidazole compound is used as a latent thermosetting agent for epoxy resin. Also, a compound prepared by treating the imidazole compound with an isocyanate compound, which is used as the latent thermosetting agent for epoxy resin, has been known (Japanese Patent Application Public Disclosure No. SHO 59-27914(A)). The known compound has been commercialized by Asahi Chemical Industry Co., Ltd. of a Japanese company under the name of "Novacure".

U.S. Pat. No. 4,703,338 (Sagami et al.) discloses a resin composition for sealing an electronic device such as a liquid crystal display unit, which comprises a polymerizable vinyl monomer such as acrylated epoxy resin, glycerol mono(meth)acrylate and isobornyl(meth)acrylate.

OBJECT OF THE INVENTION

An object of this invention is to provide a sealing compound which has excellent adhesive properties, moisture resistance and heat resistance, and particularly, can exhibit excellent preservative stability without giving rise to failure in orientation even under hot and humid conditions.

SUMMARY OF THE INVENTION

To attain the object described above according to this invention, there is provided a compound for sealing liquid crystal, which mainly comprises (A) isobornyl(meth)acrylate, (B) epoxy acrylate, (C) a photopolymerizable initiator, (D) epoxy resin having one or more polymerizable groups in one molecule, (E) a latent thermosetting agent obtained by pretreating imidazole compounds, adducts of imidazole compounds and carboxylic acid of imidazole compounds, and/or adducts of imidazole compounds and epoxy resin with isocyanate compounds.

It has been so far known that the preservative stability of epoxy resin compounds is improved by using the compounds obtained by pretreating the imidazole compounds with the isocyanate compounds as the latent thermosetting agent for epoxy resin. According to this invention, the preservative stability of the sealing compound for liquid crystal can be more remarkably improved by using a combination of the aforesaid isobornyl(meth)acrylate and the latent thermosetting agent obtained by pretreating the imidazole compounds, the adducts of the imidazole compounds and the carboxylic acid of the imidazole compounds, and/or the adducts of the imidazole compounds and the epoxy resin with the isocyanate compounds.

To the sealing compound according to this invention, may optionally be added a coupling agent to improve its adhesive properties, an inorganic filler for controlling the viscosity of the sealing compound, and a spacer for adjusting the gap between substrates of a liquid crystal display unit.

Other and further objects of this invention will become obvious upon an understanding of the embodiments about to be described or will be indicated in the appended claims, and various advantages not referred to herein will occur to one skilled in the art upon employment of the invention in practice.

DESCRIPTION OF THE PREFERRED EMBODIMENTS

The sealing compound of this invention for sealing liquid crystal confined between the electrode substrates has excellent heat-resistance and moisture-resistance, and can produce sufficient adhesive strength to hold in position the electrode substrates. The sealing composition of this invention comprises (A) isobornyl(meth)acrylate, (B) epoxy acrylate, (C) a photopolymerization initiator, (D) epoxy resin having one or more polymerizable groups in one molecule, (E) a latent thermosetting agent obtained by pretreating imidazole compounds, adducts of imidazole compounds and carboxylic acid, and/or adducts of imidazole compounds and epoxy resin with isocyanate compounds.

The aforementioned isobornyl(meth)acrylate (A) is expressed by the following general formula (1) or (2):

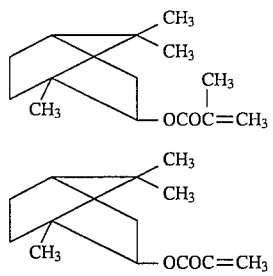

The epoxy acrylate specified in (B) is prepared by reacting an epoxy resin with (meth) acrylic acid substantially equivalent to an epoxy group in the epoxy resin or reacting an epoxy resin with a mixture of (meth) acrylate having a carboxyl group equivalent to a glycidyl group in the epoxy resin and polybasic acid.

As the epoxy acrylate, there are adducts of epoxy resin and (meth) acrylic acid or (meth)acrylate having a carboxyl group, such as types of bisphenol-A diglycidyl ether, glycerin diglycidyl ether, polyalkylene glycol diglycidyl ether, polyacid diglycidyl ester, cyclohexiene oxide.

As the photopolymerization initiator (C) noted above, there may be used compounds, which produce a radical on exposure to electron rays or ultraviolet rays, such as 1-hydroxy cyclohexyl phenylketone, 2,2-dimethoxy-2-phenyl acetophenone, 2-hydroxy-2-methyl-1-phenylpropane-1-on, diethoxyaceto phenone, 2-methyl-1-(4-methylthiophenyl)-2-morpholino-propane-1-on, benzophenone, benzoin isopropy ether, and methylphenyl glyoxylate.

As the aforesaid compound (D) having at least one polymerizable glycidyl group in one molecule, an epoxy resin having at least one polymerizable glycidyl group, and an epoxy resin produced by open-cyclic polymerization of glycidyl group can be enumerated, but should not be understood as limitative.

As tile epoxy resin in this embodiment, bisphenol-A type epoxy resin, bisphenol-F type epoxy resin, bisphenol-AD type epoxy resin, hydrogenated epoxy resin, novolac type epoxy resin, (mono)glycidyl ester type epoxy resin, polyurethane-modified epoxy resin, nitrogen epoxy resin having epoxidized methalkylene diamine, and rubber-modified epoxy resin containing butadiene or NBR can be enumerated, but should not be understood as limitative. That is, it can be used even in its solid or liquid form.

The latent thermosetting agent (E) as noted above is an obtained by pretreating imidazole compounds, adducts of imidazole compounds and carboxylic acid, and/or adducts of imidazole compounds and epoxy resin with isocyanate compounds. The imidazole compound used in this embodiment has active hydrogen at the first position of the imidazole ring. For instance, as the imidazole compound, there are imidazole, 2-methyl imidazole, 2-ethyl imidazole; 2-ethyl-4-methyl imidazole, 2-isopropyl imidazole, 2-phenyl imidazole, and 2-dodecyl imidazole.

The aforesaid adduct of imidazole compounds and carboxylic acid is a compound having carboxylic acid added to active hydrogen in imidazole ring. The carboxylic acid which is subject to such addition reaction includes acetic acid, lactic acid, salicylic acid, benzonic acid, adipic acid, phtalic acid, and maleic acid.

The aforesaid adducts of imidazole compound and epoxy resin are products obtained by adding epoxy resin to imidazole compounds at the equivalent ratio at which one active hydrogen in the imidazole ring contains 0.8 to 1.5 of glycidyl group and subjecting the imidazole compounds with epoxy resin to addition reaction.

As the isocyanate compound used for pretreating the aforesaid imidazole to obtain the latent thermosetting agent, there may be enumerated phenylisocyanate, tetramethylene diisocyanate, hexamethylene diisocyanate, tolylene diisocyanate, xylylene diisocyanate, diphenylmethane diisocyanate, adduct of tolylene diisocyanate and trimethylolpropane, and adduct of tolylene diisocyanate and polyethylene glycol.

To further improve the adhesive properties of the sealing compound of the invention, there may be added a coupling agent for increasing the adhesive strength, phosphorus compounds such as bis[(2-hydroxyethyl)-methacrylate]acid phosphite, a coloring agent such as dyes and pigment, a polymerization inhibitor, an oxidation inhibitor, a leveling agent, an inorganic filler for controlling the viscosity of the sealing compound and a spacer compound for adjusting the distance between the electrode substrates.

According to this invention, in assembling the liquid crystal display unit, the sealing compound put between the electrode substrates is exposed to light (ultraviolet rays) to be primarily hardened, and then, subject to isotropic heating to be completely hardened. Thus, the sealing agent of this invention can be hardened for a short time, thus improving productivity of manufacturing the liquid crystal display unit in comparison with a conventional one-fluid epoxy resin.

[EXPERIMENTAL EXAMPLE]

The experiments of the embodiments described above were attempted to verify the excellent properties of the sealing compounds according to the present invention. The experimental results are shown in Table 1 below.

The first and second Embodiments 1 and 2 (EX_1 and EX_2) of the sealing compounds according to the present invention which contain photo(UV)-setting component and thermosetting components such as isobornyl methacrylate. In the experiments, the preservative stability, adhesive properties and orientation of the sealing compound of the invention were evaluated.

Comparative compounds $CM_{13}$ 1 and CM_2 comprises 2-hydroxyethyl-methacrylate in place of isobornyl methacrylate as used in the Embodiments of the invention as stated above. Another comparative compound CM_3 contains no isobornyl methacrylate.

TABLE 1

|  | EX_1 | EX_2 | CM_1 | CM_2 | CM_3 |
| --- | --- | --- | --- | --- | --- |
| Epoxy acrylate | 20 | 35 | 20 | 35 | 20 |
| Isobornyl-methacrylate | 20 | 35 |  |  |  |
| 2-hydroxymethyl-methacrylate |  |  | 20 | 35 |  |
| 2-hydroxy cyclohexyl-phenylketone | 3 | 3 | 3 | 3 | 3 |
| Epikoto #807* | 30 | 10 | 30 | 30 | 30 |
| Novacure 3971HPX* | 30 | 20 | 30 | 30 | 30 |
| Glycidyl trimethoxysilan | 1 | 1 | 1 | 1 | 1 |
| Alumina | 50 | 50 | 50 | 50 | 50 |
| Viscosity (Pa · s) | 35 | 35 | 35 | 35 | 150 |
| Moisture-permeability (g/m$^2$ · 24 h) | 10 | 13 | 20 | 25 | 20 |
| Stability in preservation (25° C.) | >3 mon. | >3 mon. | 10 days | 5 days | 20 days |
| Peeling resistance/adhesive strength | ⊙ | ⊙ | ⊙ | ⊙ | ⊙ |
| Orientation (80° C. × 1000 h) | ⊙ | ⊙ | X | X | X |
| Orientation (60° C. × 95% RH × 1000 h) | ⊙ | ⊙ | O | O | O |
| Voltage holding ability (80° C. × 1000 h) | ⊙ | ⊙ | X | X | X |
| Voltage holding ability (60° C. × 95% RH × 1000 h) | ⊙ | ⊙ | O | O | O |

Remarks
⊙ ... Very excellent
O ... Excellent
Δ ... Available
X ... Unavailable
*"Epikoto #807" is made by Three Bond Co., Ltd.
*"Novacure 3971HPX" is made by Asahi Chem. Ind. Co., Ltd.

As shown in Table 1, the sealing compounds of Embodiments EX_1 and EX_2 are different in compounding ratio of the photo(UV)-setting agent and the thermosetting agent. However, since these sealing compounds uses isobornyl methacrylate as a monomer, the stability of preservation can be maintained over three months at room temperature. Thus, the sealing compounds of these embodiments can be applied practically. Furthermore, these sealing compounds after hardening within the liquid crystal display unit could ensure sufficient heat-resistance and moisture-resistance for a long time.

On the contrary, the comparative compounds CM_1 and CM_2 were extremely lowered in stability of preservation in the test. When the comparative compounds primarily hardened by exposure to light (ultraviolet rays) were further hardened by heating for obtaining isotropic structure after enclosing liquid crystal in between the electrode substrates, they were degraded in orientation.

As is apparent from the foregoing description, the sealing compound according to this invention has excellent adhesive properties, moisture resistance and heat resistance and can exhibit excellent properties without giving rise to failure in orientation even under hot and humid conditions. Besides, since the sealing compound of the invention enjoys an advantageous mutual action of the isobornyl(meth)acrylate and latent thermosetting agent obtained by pretreating imidazole compounds, adducts of imidazole compounds and carboxylic acid of imidazole compounds, it excels in preservative stability.

Furthermore, in assembling the liquid crystal display unit, the sealing compound put between the electrode substrates is exposed to light (ultraviolet rays) to be primarily hardened, and then, subject to isotropic heating to be completely hardened. Thus, the sealing agent of this invention can be hardened for a short time, thus improving productivity of manufacturing the liquid crystal display unit in comparison with a conventional one-fluid epoxy resin. Moreover, according to this invention, high reliable liquid crystal display units can readily be produced without causing misregistration of substrates with driving electrodes.

As can be readily appreciated, it is possible to deviate from the above embodiments of the present invention and, as will be readily understood by those skilled in this art, the invention is capable of many modifications and improvements within the scope and spirit thereof. Accordingly, it will be understood that the invention is not to be limited by these specific embodiments, but only by the scope and spirit of the appended claims.

What is claimed is:

1. A composition comprising (A) isobornyl(meth) acrylate, (B) epoxy acrylate, (C) a photopolymerization initiator, (D) an epoxy resin having one or more polymerizable glycidyl groups, and (E) a latent thermosetting agent obtained by treating an imidazole compound, an adduct of an imidazole compound and a carboxylic acid, and/or an adduct of an imidazole compound and an epoxy sin with an isocyanate compound.

2. The composition as claimed in claim 1, wherein said latent thermosetting agent comprises an imidazole compound which has been treated with an isocyanate compound, and wherein said imidazole compound is selected from the group consisting of imidazole, 2-methylimidazole, 2-ethylimidazole, 2-ethyl-4-methylimidazole, 2-isopropylimidazole, 2phenylimidazole, and 2-dodecylimidazole.

3. The composition as claimed in claim 1, comprising an adduct of an imidazole compound and a carboxylic acid which has been treated with an isocyanate compound, wherein said imidazole compound is selected from the group consisting of imidazole, 2-methylimidazole, 2-ethylimidazole, 2-ethyl-4-methylimidazole, 2-isopropylimidazole, 2-phenylimidazole, and 2-dodecylimidazole, and wherein said carboxylic acid is selected from the group consisting of acetic acid, lactic acid, salicylic acid, benzoic acid, adipic acid, phthalic acid, and maleic acid.

4. The composition as claimed in claim 1, comprising an adduct of an imidazole compound and an epoxy resin which has been treated with an isocyanate compound, wherein said imidazole compound is selected from the group consisting of imidazole, 2-methylimidazole, 2-ethylimidazole, 2-ethyl-4-methylimidazole, 2-isopropylimidazole, 2-phenylimidazole, and 2-dodecylimidazole.

5. The composition as claimed in claim 1, wherein said isocyanate compound is selected from the group consisting of phenylisocyanate, tetramethylene diisocyanate, hexamethylene diisocyanate, toluene diisocyanate, xylene diisocyanate, diphenylmethane diisocyanate, an adduct of toluene diisocyanate and trimethylolpropane, and an adduct of toluene diisocyanate and polyethylene glycol.

6. The composition as claimed in claim 2, wherein said isocyanate compound is selected from the group consisting of phenylisocyanate, tetramethylene diisocyanate, hexamethylene diisocyanate, toluene diisocyanate, xylene diisocyanate, diphenylmethane diisocyanate, an adduct of toluene diisocyanate and trimethylolpropane, and an adduct of toluene diisocyanate and polyethylene glycol.

7. The composition as claimed in claim 3, wherein said isocyanate compound is selected from the group consisting of phenylisocyanate, tetramethylene diisocyanate, hexamethylene diisocyanate, toluene diisocyanate, xylene diisocyanate, diphenylmethane diisocyanate, an adduct of toluene diisocyanate and trimethylolpropane, and an adduct of toluene diisocyanate and polyethylene glycol.

8. The composition as claimed in claim 4, wherein said isocyanate compound is selected from the group consisting of phenylisocyanate, tetramethylene diisocyanate, hexamethylene diisocyanate, toluene diisocyanate, xylene diisocyanate, diphenylmethane diisocyanate, an adduct of toluene diisocyanate and trimethylolpropane, and an adduct of toluene diisocyanate and polyethylene glycol.

* * * * *